(12) United States Patent
Horvitz et al.

(10) Patent No.: US 6,601,012 B1
(45) Date of Patent: Jul. 29, 2003

(54) CONTEXTUAL MODELS AND METHODS FOR INFERRING ATTENTION AND LOCATION

(75) Inventors: Eric J. Horvitz, Kirkland, WA (US); David O. Hovel, Bellevue, WA (US); Andrew W. Jacobs, Seattle, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 09/596,364

(22) Filed: Jun. 17, 2000

Related U.S. Application Data

(60) Provisional application No. 60/189,801, filed on Mar. 16, 2000.

(51) Int. Cl.$^7$ .................................................. G06F 3/00
(52) U.S. Cl. ..................... 702/150; 707/500; 709/223; 345/337
(58) Field of Search .......................... 702/150; 706/12; 709/223, 206, 100; 707/500; 345/707

(56) References Cited

U.S. PATENT DOCUMENTS

| | | | |
|---|---|---|---|
| 5,864,848 A | | 1/1999 | Horvitz |
| 6,021,403 A | | 2/2000 | Horvitz |
| 6,262,730 B1 | * | 7/2001 | Horvitz et al. |

OTHER PUBLICATIONS

U.S. patent application Ser. No. 09/007,894, Horvitz, A Technique for Prefetching . . . , filed Jan. 15, 1998.
U.S. patent application Ser. No. 09/055,477, Methods and Apparatus for . . . , filed Apr. 6, 1998.
U.S. patent application Ser. No. 09/364,522, Horvitz, Methods for Display . . . , filed Jul. 30, 1999.
U.S. patent application Ser. No. 09/364,528, Horvitz, Methods for Routing . . . , filed Jul. 30, 1999.
U.S. patent application Ser. No. 09/365,293, Horvitz, Integration . . . , filed Jul. 30, 1999.
U.S. patent application Ser. No. 09/365,287, Horvitz, A Computational . . . , filed Jul. 30, 1999.
U.S. patent application Ser. No. 09/364,527, Horvitz, Method for Automatically . . . , filed Jul. 30, 1999.
M. Sahami et al, (1998), A Bayesian approach to filtering junk email, in Workshop on learning for text categorizations, AAAI Technical Report WS–98–05, AAAI.
D. Koller et al, (1996) Toward optimal feature selection, in proceedings of 13$^{th}$ conference on machine learning, pp. 284–292, Morgan Kaufmann, San Francisco.
E. Horvitz et al, (1998) The Lumiere project, Bayesian user modeling for inferring the goals and needs of software users, in proceedings of the 14$^{th}$ conf on uncertainty in AI, pp. 256–265, Morgan Kaufmann, San Francisco.
J. Platt (1999), Probabilistic outputs for support vector machines and comparisons to regularized likelihood methods, in Advances in Large Margin Classifiers, MIT Press, Cambridge, MA.

(List continued on next page.)

*Primary Examiner*—Kamini Shah
(74) *Attorney, Agent, or Firm*—Amin & Turocy, LLP

(57) ABSTRACT

Determination of the current context of the user, such as the user's current location and attentional state, is disclosed. The determined context can be used to assist determination as to whether, when and how notifications intended for the user should be conveyed to him or her. In varying embodiments of the invention, the context is determined via one or more of: direct specification by the user; direct measurement using one or more sensors; a user-modifiable profile indicating context; one or more potentially user-modifiable rules that indicate context; and, and inferential analysis utilizing a model, such as a Bayesian network or other statistical model.

32 Claims, 7 Drawing Sheets

OTHER PUBLICATIONS

H. Leiberman (1995), Letizia, An agent that assists web browsing, in proceedings of IJCAI–95, Montreal Canada, Morgan Kaufmann, San Francisco.

Horvitz et al, (1995) Display of information for time–critical decision making, in proceedings of the $11^{th}$ conf on uncertainty in AI, pp. 296–305, Monetrea, Canada.

M. Czerwinski et al (1999), Visualizing implicit queries for information management and retrieval, in proceedings of CHI'99, ACM SIGCHI Conf on informational and knowledge management, pp. 560–567, ACM.

S. Dumais et al (1998), Inductive learning algorithms and representations for text categorization, in Proceedings of $7^{th}$ Intl Conf on Information and Knowledge Management, pp. 148–155, ACM.

Platt (1999), Fast training of support vector machines sequential minimal optimization, in advances in kernal methods, support vector learning, MIT Press, Cambridge, MA.

Horvitz (1999), Principles of mixed–initiative user interfaces, in Proceedings of CHI'99, ACM SIGCHI Conf on Human Factors in Computing Systems, Pittsburgh, PA, 159–166, ACM.

Breese et al (1998) Empirical analysis of predictive algorithms for collaborative filtering, in Proceedings of the $14^{th}$ conf on uncertainty in AI, pp. 43–52, AUAI, Morgan Kaufmann, San Francisco.

Horvitz, Rutledge (1991), Time dependent utility and action under uncertainty, in proceedings of $7^{th}$ conf on uncertainty in AI, LA, CA, pp. 151–158, Morgan Kaufmann, San Francisco.

Horvitz, Seiver (1977), Time–critical action: representations and application, in proceedings of the $13^{th}$ conf on uncertainty in AI (UAI–97), pp. 250–257, Providence, RI, Morgan Kaufmann, San Francisco.

* cited by examiner

FIG 3
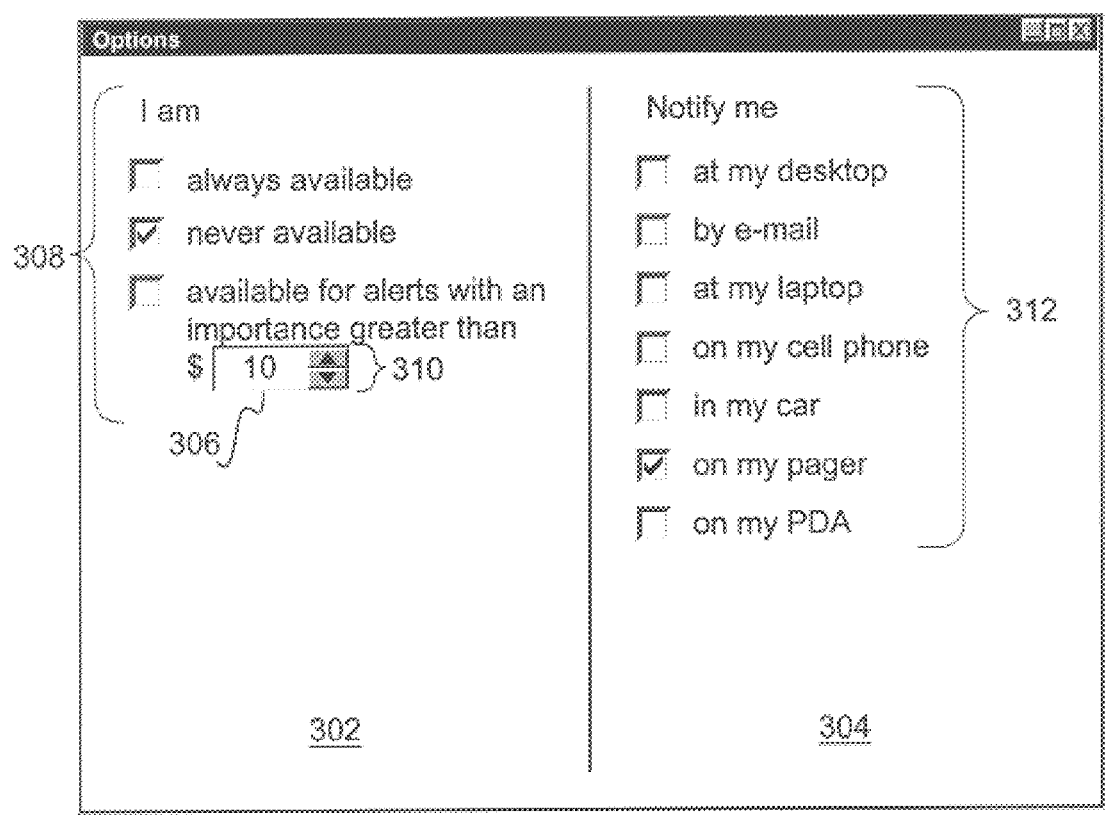
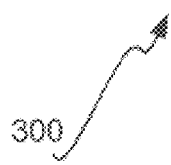

CONTEXTUAL MODELS AND METHODS FOR INFERRING ATTENTION AND LOCATION

RELATED APPLICATIONS

The present application claims the benefit of the provisional patent application filed on Mar. 16, 2000, entitled "Attentional Systems and Interfaces," and assigned serial No. 60/189,801.

FIELD OF THE INVENTION

This invention relates generally to unified receipt and notification of alerts generated by varied devices and applications for conveyance to a user, and more particularly to determining the context of the user, such as the user's attention and location, for utilization with such unified alert receipt and notification.

BACKGROUND OF THE INVENTION

Many computer users today receive information from a number of different sources, and utilize a number of different devices in order to access this information. For example, a user may receive e-mail and instant messages over a computer, pages over a pager, voice-mail over a phone, such as a cellular ("cell") or landline phone, news information over the computer, etc. This makes it difficult for the user to receive all his or her different information, referred to also as alerts or notifications, wherever the user happens to be.

For example, a user may be away from his or her computer, but receive an important e-mail. The user may have access only to a cell phone or a pager, however. As another example, the user may be working on the computer, and have turned off the ringer and voice-mail indicator on the phone. When an important voice-mail is left, the user has no way of receiving this information on the computer.

Moreover, many of the alerts may not be important to the user—for example, an e-mail from the user's manager or co-worker should receive higher priority than the latest sports scores. More generally, the value of the information contained in an alert should be balanced with the costs associated with the disruption of the user by an alert. Both the costs and value may be context sensitive. Beyond notifications about communications, users are alerted with increasing numbers of services, error messages, and computerized offers for assistance.

The prior art does not provide for alerts following the user, for the prioritization of the alerts, nor for considering the potentially context-sensitive value and costs associated with notifications. However, in the cofiled, copending and coassigned patent application Ser. No. 09/596,365 entitled "Notification Platform Architecture," an architecture is described that can receive alerts from a number of different sources, called notification sources, and convey them to any of a number of different outputs, called notification sinks. An analysis is made as to when, whether, and to which sinks a notification should be conveyed. In one embodiment, the analysis takes into account the context of the user—that is, the user's current location and attentional state.

SUMMARY OF THE INVENTION

This invention relates to determining the current context of the user, such as the user's current location and attentional state. This context can then be used to assist determination as to whether, when and how notifications intended for the user should be conveyed to him or her. In varying embodiments of the invention, the context is determined via one or more of: direct specification by the user; direct measurement using one or more sensors; a user-modifiable profile indicating context; one or more potentially user-modifiable rules that indicate context; and, and inferential analysis utilizing a model, such as a Bayesian or a statistical model.

Thus, embodiments of the invention determine the context of the user, including the user's location and attentional state (or, focus), which can then be used to assist in the conveying of notifications to the user. The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 3 is a diagram showing how a user can directly specify his or her context, according to an embodiment of the invention;

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Computerized Device

Figure 1:
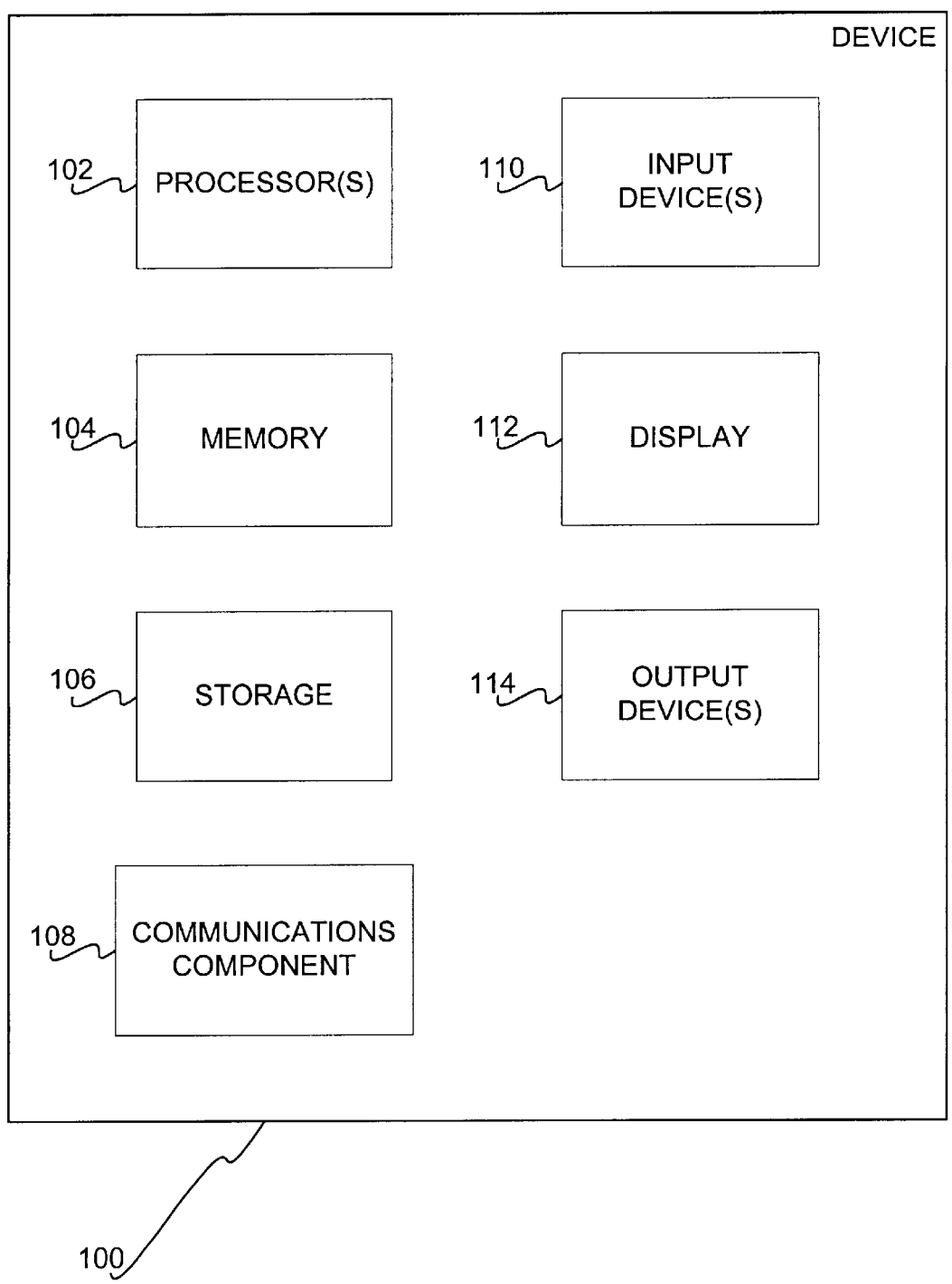
FIG. 1 is a diagram of an example computerized device in conjunction with which embodiments of the invention can be practiced.

Referring to FIG. 1, a diagram of an example computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device (s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Example Architecture

Figure 2:
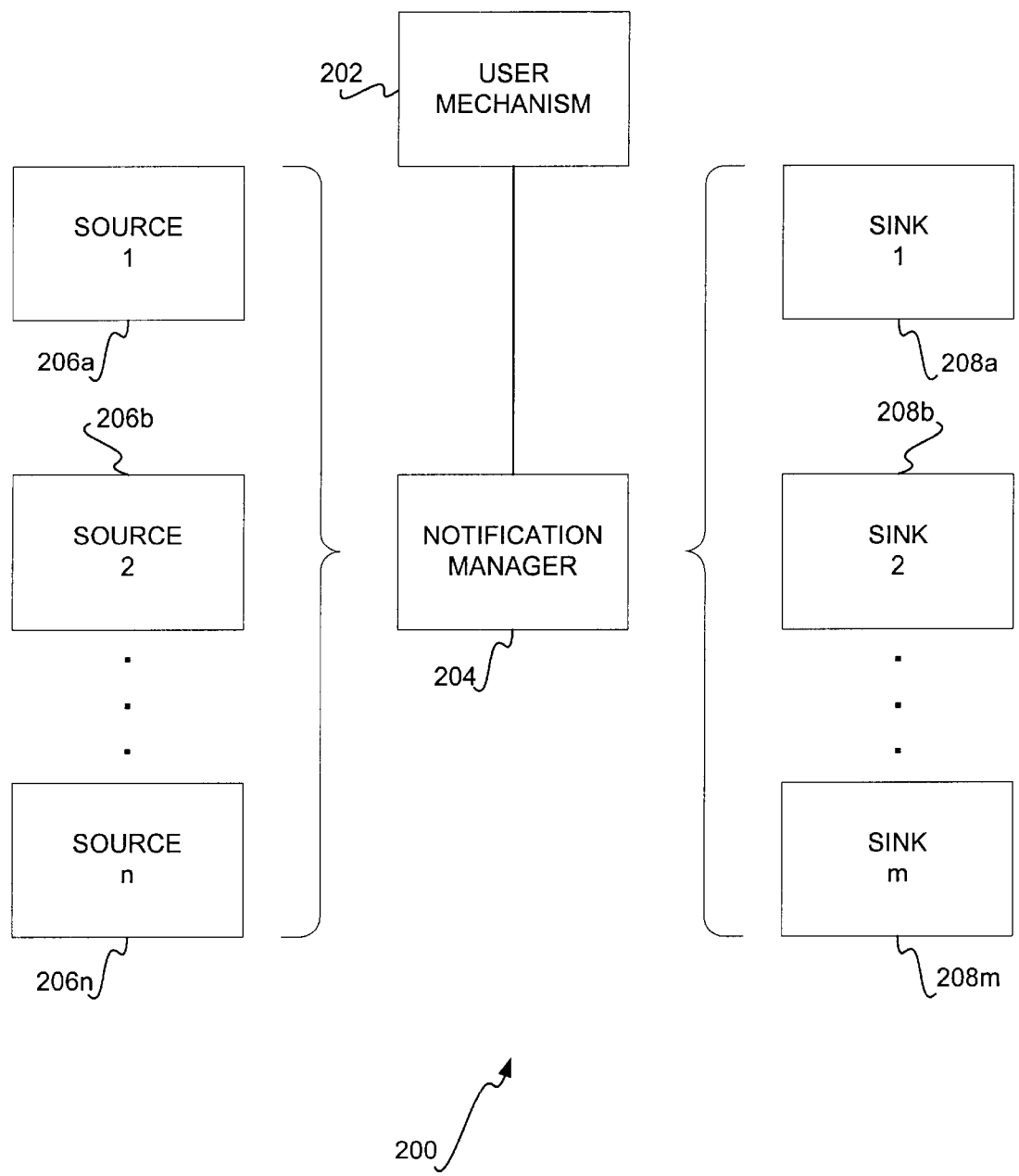
FIG. 2 is a diagram of a notification architecture in conjunction with which embodiments of the invention can be practiced.

In this section of the detailed description, an example notification architecture in conjunction with which embodiments of the invention may be used is described, in conjunction with the diagram of FIG. 2. In one embodiment, the architecture utilized is that which is particularly described in the copending, cofiled, and coassigned patent application Ser. No. 09/596,365 entitled "Notification Platform Architecture,". The architecture 200 of FIG. 2 includes a user mechanism 202, a notification manager 204, a number of notification sources 206a, 206b, ..., 206n, and a number of notification sinks 208a, 208b, ..., 208m, where there can be any number of sinks and sources. In general, the notification manager 204 conveys notifications from the sources 206 to the sinks 208, based on information stored in the user mechanism 202. Each of the components of the architecture 200 of FIG. 2 is now described in turn.

The user mechanism 202 stores information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have in different locations. Such parameters may also be functions of observations made autonomously via one or more sensors. For example, profiles may be selected or modified based on information about a user's location as might be provided by a Global Positioning System (GPS) subsystem, on information about the type of device being used and/or the pattern of usage of the device, the last time a device of a particular type was accessed by the user, etc. Beyond relying on sets of predefined profiles or dynamic inference, the notification architecture can also allow users to specify in real-time his or her state, such as the user not being available except for important notifications for the next x hours, or until a given time.

Parameters can include default notification preference parameters regarding a user's preference as to being disturbed by notifications of different kinds in different settings, which can be used as the basis from which to make notification decisions by the notification manager 204, and the basis upon which a particular user can make changes. The parameters may include default parameters as to how the user wishes to be notified in different situations, such as by cell phone, by pager, etc. The parameters can include such assessments as the costs of disruption associated with being alerted by different modes in different settings. That is, the parameters can include contextual parameters indicating the likelihoods that the user is in different locations, the likelihoods that different devices are available, and the likelihoods of his or her attentional status at a given time, as well as notification parameters indicating how the user desires to be notified at a given time.

The information stored by the user mechanism 202 can be inclusive of contextual information determined by the mechanism 202. The contextual information is determined by the mechanism 202 by discerning the user's location and attentional status based on one or more contextual information sources, as is described in more detail in a later section of the detailed description. The mechanism 202, for example, may be able to determine with precision the actual location of the user via a global-positioning system (GPS) that is a part of a user's car, cell phone, etc. The mechanism 202 may also use a statistical model to determine the likelihood that the user is in a given state of attention (e.g., open to receiving notification, busy and not open to receiving notification, etc.) by considering background assessments and/or observations gathered through considering such information as the type of day (e.g., weekday, weekend, holiday), the time of day, the data in the user's calendar, and observations about the user's activity. The determination of context is performed as described in subsequent sections of the detailed description.

Each of the sources 206a, 206b, . . . , 206n is able to generate notifications intended for the user. For example, the sources 206 may include communications, such as Internet and network-based communications, local desktop computer-based communications, and telephony communications, as well as software services, such as intelligent help, background queries, automated scheduling, etc.

For example, e-mail may be generated as notifications by an e-mail notification source such that they are prioritized, where the host application program generating the notifications assigns the e-mail with relative priorities corresponding to the likely importance or urgency of the e-mail to the user. The e-mail may also be sent without regard to their relative importance to the user. Desktop-centric notifications can include an automated dialog with the goal of alerting a user to a potentially valuable service that he or she may wish to execute (e.g., scheduling from a message), information that the user may wish to review (e.g., derived from a background query), or errors and other alerts generated by a desktop computer. Internet-related services can include notifications including information that the user has subscribed to, such as headlines of current news every so often, stock quotes, etc.

Other notifications can include background queries (e.g., while the user is working, text that the user is currently working on may be reviewed such that background queries regarding the text are formulated and issued to search engines), scheduling tasks from a scheduling or other program, etc. Notification sources 206 can themselves be push-type or pull-type sources. Push-type sources are those that automatically generate and send information without a corresponding request, such as headline news and other Internet-related services that send information automatically once subscribed to. Pull-type sources are those that send information in response to a request, such as e-mail being received after a mail server is polled.

Each of the notification sinks 208a, 208b, . . . , 208n is able to provide the notifications to the user. For example, such notification sinks 208 can include computers, such as desktop and/or laptop computers, handheld computers, cell phones, landline phones, pagers, automotive-based computers, etc. It is noted that some of the sinks 208 can convey notifications more richly than other of the sinks 208. For example, a desktop computer typically has speakers and a relatively large color display attached to it, as well as having a high bandwidth for receiving information when attached to a local network or to the Internet. Therefore, notifications can be conveyed by the desktop computer to the user in a relatively rich manner. Conversely, most cell phones have a small display that is black and white, and receive information at relatively low bandwidth. Correspondingly, the information associated with notifications conveyed by the cell phone usually must be shorter and geared towards the phone's known limitations. Thus, the content of a notification may differ depending on whether it is to be sent to a cell phone or a desktop computer.

The notification manager 204 accesses the information stored by the user mechanism 202, and makes a decision as to which of the notifications it receives from the sources 206 to convey to which of the sinks 208 based on this information. Furthermore, the manager 204 is able to determine how the notification is to be conveyed, depending on which of the sinks 208 it has selected to send the information to. For example, it may determine that the notification should be summarized before being provided to a given of the sinks 208. The manager 204 can be a computer program executed by a processor of a computer from a machine-readable medium such as a memory thereof.

The invention is not limited to how the manager 204 makes its decisions as to which of the notifications to convey to which of the notification sinks, and in what manner the notifications are conveyed. For example, a decision-theoretic analysis can be made, such that the notification manager is designed to infer important uncertainties about variables including a user's location, attention, device availability, and amount of time until the user will access the information if there were no alert, and make notification decisions about whether to alert a user to a notification, and if so, the nature of the summarization and the best device or devices to employ for relaying the notification. In general, the manager 204 determines the net expected value of a notification, considering the fidelity and transmission reliability of each available notification sink, as well as the attentional cost of disturbing the user, the novelty of the information to the user, the time until the user will review the information on his or her own, and the potentially context-sensitive value of the information and the increasing and/or decreasing value over time of the information contained within the notification.

The inferences made about uncertainties thus may be generated as expected likelihoods of values such as the cost of disruption to the user with the use of a particular mode of a particular device given some attentional state of the user, etc. The notification manager 204 makes decisions as to what the user is currently attending to and doing (based on, for example, contextual information), where the user currently is, how important the information is, what is the cost of deferring the notification, how distracting would a notification be, what is the likelihood of getting through to the user, what is the fidelity loss associated with a given notification sink, etc. Therefore, ultimately, the notification manager 204 performs an analysis, such as a decision-theoretic analysis, of pending and active notifications, evaluates context-dependent variables provided by information sinks and sources, and infers key uncertainties, such as the time until a user is likely to review provided information and the user's location and current attentional state.

Furthermore, the notification manager 204 can access information stored in a user profile by the user mechanism 202 in lieu of or to support a personalized decision-theoretic analysis. For example, the user profile may indicate that at a given time, the user prefers to be notified via a pager, and only if the notification has a predetermined importance level. Such information can be used as a baseline from which to start a decision-theoretic analysis, or can be the only manner by which the manager 204 determines how and whether to notify the user.

Determining User Context via Direct Specification and/or a User-Modifiable Profile In this section of the detailed description, the determination of user context by direct specification by the user, and/or a user-modifiable profile, is described. The context of the user can include the attentional focus of the user—that is, whether the user is currently amenable to receiving notification alerts—as well as the user's current location. The invention is not so limited, however.

Direct specification of context by the user means that the user indicates whether or not he or she is available to receive alerts, and where the user desires to receive them. A default profile can be used to indicate a default attentional state, and a default location where the user is to receive the alerts. The default profile can then be modified by the user as desired.

Referring to FIG. 3, a diagram showing how direct specification of context can be implement, according to an embodiment of the invention, is shown. The window 300 has an attentional focus section 302 and a location section 304. In the focus section 302, the user can check one of three check boxes 308, indicating whether the user is always available to receive alerts; whether the user is never available to receive alerts; and, whether the user is only available to receive alerts that has an importance level greater than a predetermined threshold. As shown in FIG. 3, the threshold is measured in dollars, but this is for example purposes only, and the invention is not so limited. The user can increase the threshold in the box 306 by directly entering a new value, or by increasing or decreasing the threshold via the buttons 310.

In the location section 304, the user can check one or more of the check boxes 304, to indicate where the user desires to have alerts conveyed to him or her. As shown in FIG. 3, for example, the user can have alerts conveyed at the desktop, by e-mail, at a laptop, on a cell phone, in his or her car, on a pager, or on a personal digital assistant (PDA) device. These are examples only, however, and the invention itself is not so limited.

The window 300, where there are preset defaults for the checkboxes 308 and the box 306 of the section 302 and the checkboxes 312 of the section 304, can be considered a default user profile in one embodiment. The profile is user modifiable in that the user can override the default selections with his or her own desired selections. Other types of profiles can also be used in conjunction with embodiments of the invention.

Determining User Context via Direct Measurement

In this section of the detailed description, the determination of user context by direct measurement, for example, using one or more sensors, is described. The context of the user can include the user's attentional focus, as well as his or her current location. The invention itself is not so limited, however. Direct measurement of context means that sensor (s) can be used to detect whether the user is currently amenable to receiving alerts, and to detect where the user currently is. In one embodiment, an inferential analysis is used in conjunction with direct measurement, as is described in a later section of the detailed description.

Figure 4:
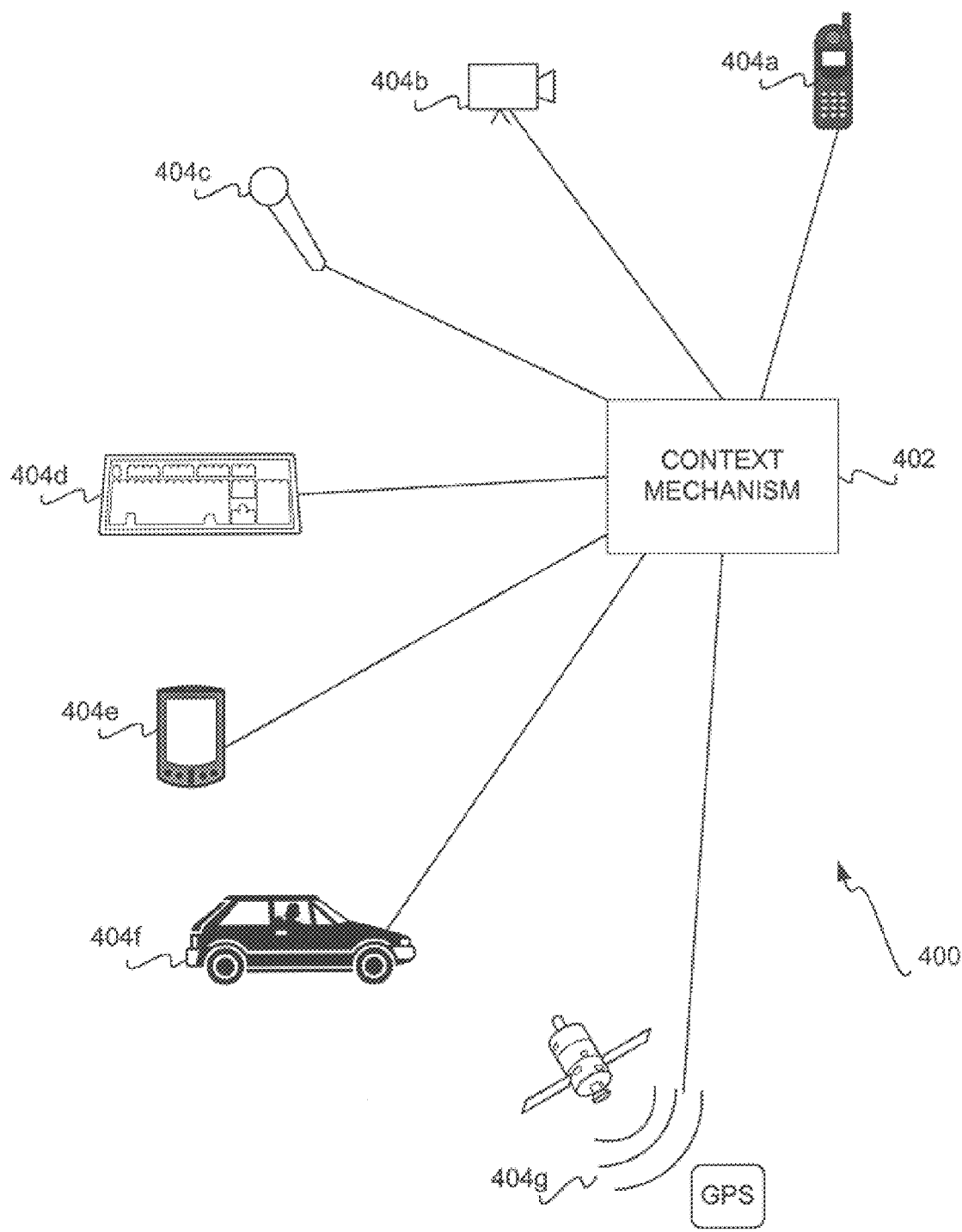
FIG. 4 is a diagram showing how context can be determined via direct measurement of a number of sensors; according to an embodiment of the invention.

Referring to FIG. 4, a diagram of a system 400 in which direct measurement of user context can be accomplished, according to an embodiment of the invention, is shown. The system 400 includes a context mechanism 402, and communicatively coupled thereto a number of sensors 404, namely, a cell phone 404a, a video camera 404b, a microphone 404c, a keyboard 404d, a PDA 404e, a car 404f, and a GPS mechanism 404g. The sensors 404 explicitly shown in FIG. 4 are for example purposes only, and do not represent a limitation or a restriction on the invention itself. The term sensor as used herein is a general and overly encompassing term, meaning any device or manner by which the context mechanism 402 can determine what the user's current attentional focus is, and/or what the user's current location is. The mechanism 402 in one embodiment is a computer program executed by a processor of a computer from a computer-readable medium thereof, such as a memory.

For example, if the user has the cell phone 404a on, this can mean that the user can receive alerts on the cell phone 404a. However, if the user is currently talking on the cell phone 404a, this can mean that the user has his or her attentional focus on something else (namely, the current phone call), such that the user should not be disturbed with a notification alert. The video camera 404b can, for example, be in the user's office, to detect whether the user is in his or her office (viz., the user's location), and whether others are also in his or her office, suggesting a meeting with them, such that the user should not be disturbed (viz., the user's focus). Similarly, the microphone 404c can also be in the user's office, to detect whether the user is talking to someone else, such that the user should not be disturbed, is typing on the keyboard (via the sounds emanating therefrom), such that the user should also not be disturbed, etc. The keyboard 404d can also be used to determine if the user is currently typing thereon, such that, for example, if the user is typing very quickly, this may mean that the user is focused on a computer-related activity, and should not be unduly disturbed (and, also indicates that the user is in fact in his or her office).

If the PDA device 404e is being used by the user, this can mean that the user is able to receive alerts at the device 404e—that is, the location at which notifications should be conveyed is wherever the device 404e is. The device 404e can also be used to determine the user's current attentional focus. The car 404f can be used to determine whether the user is currently in the car—that is, if the car is currently being used by the user. Furthermore, the speed of the car 404f can be used, for example, to determine what the user's focus is. If the speed is greater than a predetermined speed, for instance, then it may be determined that the user is focused on driving, and should not be bothered with notification alerts. Finally, the GPS device 404g can be used to precisely ascertain the user's current location, as known within the art.

Determining User Context via User-Modifiable Rules

In this section of the detailed description, the determination of user context by following user-modifiable rules is described. The context of the user can include the user's attentional focus, as well as his or her current location. The invention is not so limited, however. Determining context via rules means that a hierarchical set of if-then rules is followed to determine the user's location and/or attentional focus.

Figure 5:
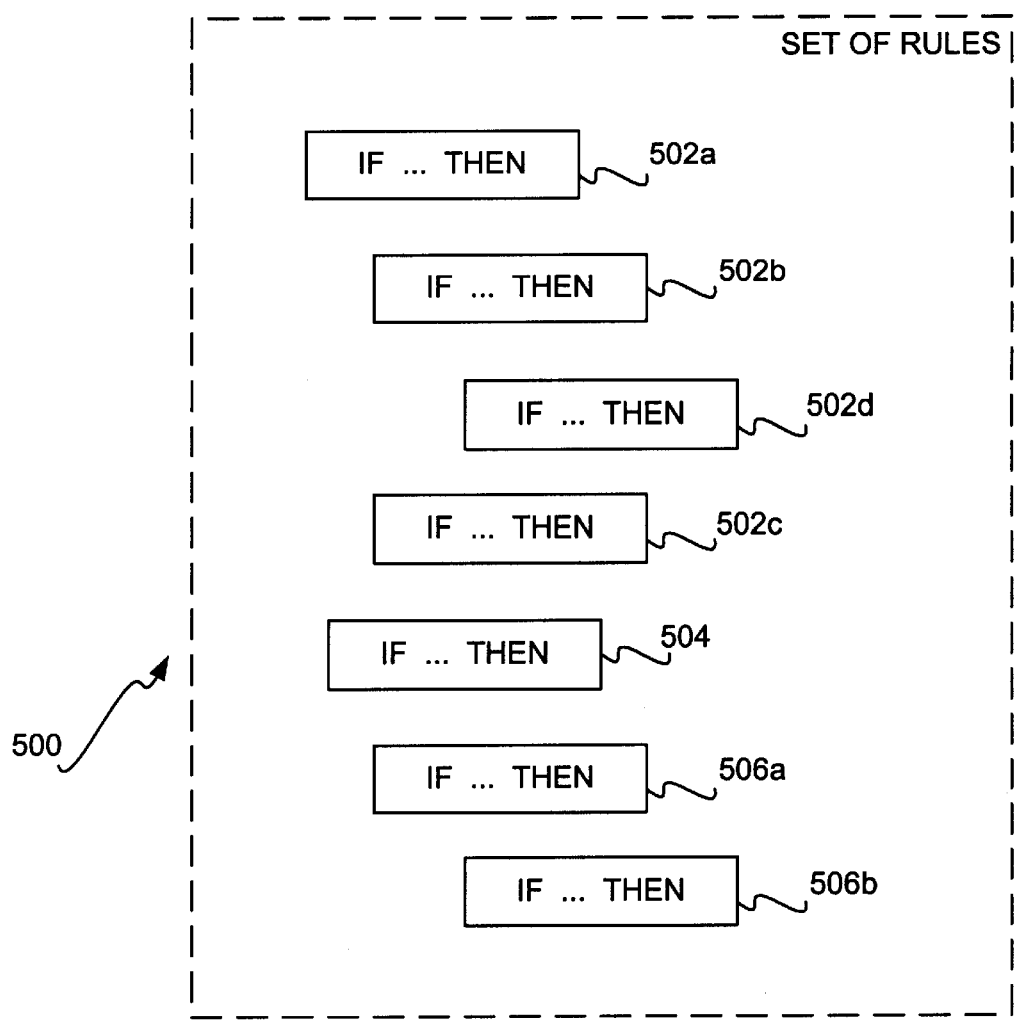
FIG. 5 is a diagram showing how can be determined via user-modifiable rules, according to an embodiment of the invention.

Referring to FIG. 5, a diagram showing a representative hierarchical ordered set of rules 500 is shown. The set of rules 500 includes rules 502a, 502b, 502c, 502d, 504, 506a and 506b. As shown in FIG. 5, rules 502b and 502c are subordinate to 502a, while rule 502d is subordinate to rule 502b, and rule 506b is subordinate to rule 506a. The rules are ordered in that rule 502a is first tested; if found true, then rule 502b is tested, and if rule 502b is found true, then rule 502d is tested, etc. If rule 502b is found false, then rule 502c is tested. If rule 502a is found false, then rule 504 is tested, which if found false, causes testing of rule 506a, which if found true causes testing of rule 506b. The rules are desirably user creatable and/or modifiable. Otherwise-type rules can also be included in the set of rules 500 (e.g., where if an if-then rule is found false, then the otherwise rule is controlling).

Thus, a set of rules can be constructed by the user such that the user's context is determined by following the rules. For example, with specific respect to location, the set of rules can be such that a first rule tests whether the current day is a weekday. If it is, then a second rule subordinate to the first rule tests whether the current time is between 9 a.m. and 5 p.m. If it is, then the second rule indicates that the user is located in his or her office, otherwise the user is at home. If the first rule is found to be false—that is, the current day is a weekend and not a weekday—then an otherwise rule may state that the user is at home. Note that this example is not meant to be a restrictive or limiting example on the invention itself.

Determining User Context via Inferential Analysis

In this section of the detailed description, the determination of user context by inferential analysis, such as by using a statistical and/or Bayesian model, is described. It is noted that context determination via inferential analysis can rely in some embodiments on other determination manners, such as direct measurement via sensor(s), as has been described. Inferential analysis as used herein means using an inference process(es) on a number of input variables, to yield an output variable(s), namely, the current context of the user. The analysis can include in one embodiment utilization of a statistical model and/or a Bayesian model.

Figure 6:
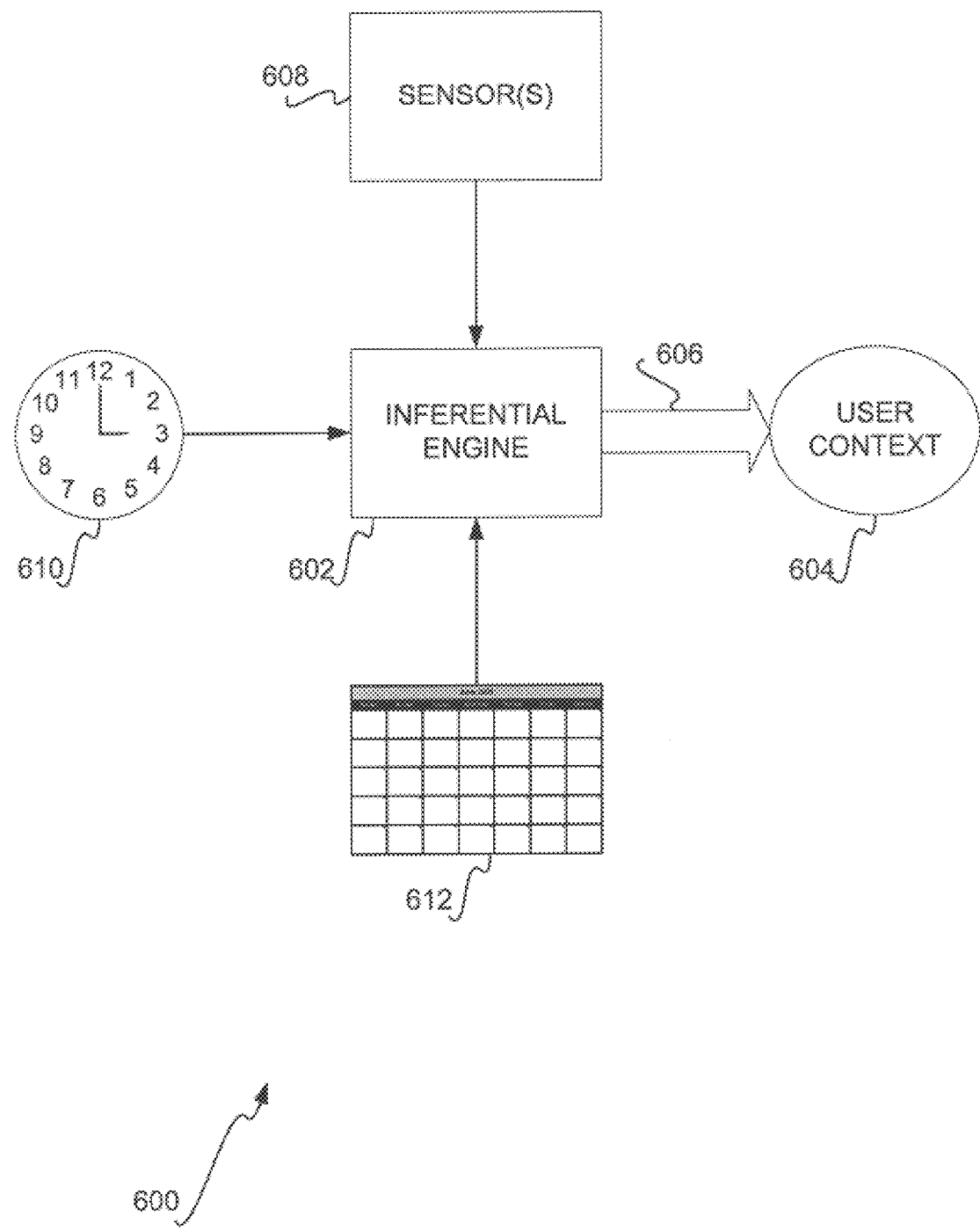
FIG. 6 is a diagram of a system showing how inferential analysis can be utilized to determine user context, according to an embodiment of the invention; and, FIG. 7 is a flowchart of a method according to an embodiment of the invention.

Referring to FIG. 6, a diagram of a system 600 is shown in which inferential analysis is performed by an inferential engine 602 to determine the user's context 604, according to an embodiment of the invention. The engine 602 is in one embodiment a computer program executed by a processor of a computer from a computer-readable medium thereof, such as a memory. The context 604 can be considered the output variable of the engine 602.

The engine 602 can rely on any of one or more input variables to make its decision. As shown in FIG. 6, such input variables can include one or more sensor(s) 608, such as the sensor(s) that have been described in conjunction with a direct measurement approach for context determination in a previous section of the detailed description, as well as the current time and day, as represented by the clock 610 in FIG. 6, and the user's calendar 612, as may be found in the user's scheduling or personal-information manager (PIM) computer program, or on the user's PDA device, etc. Other input variables can also be used besides those specifically shown in FIG. 6; the variables of FIG. 6 are not meant to be a limitation or a restriction on the invention itself.

Methods

In this section of the detailed description, methods according to varying embodiments of the invention are shown. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 7:
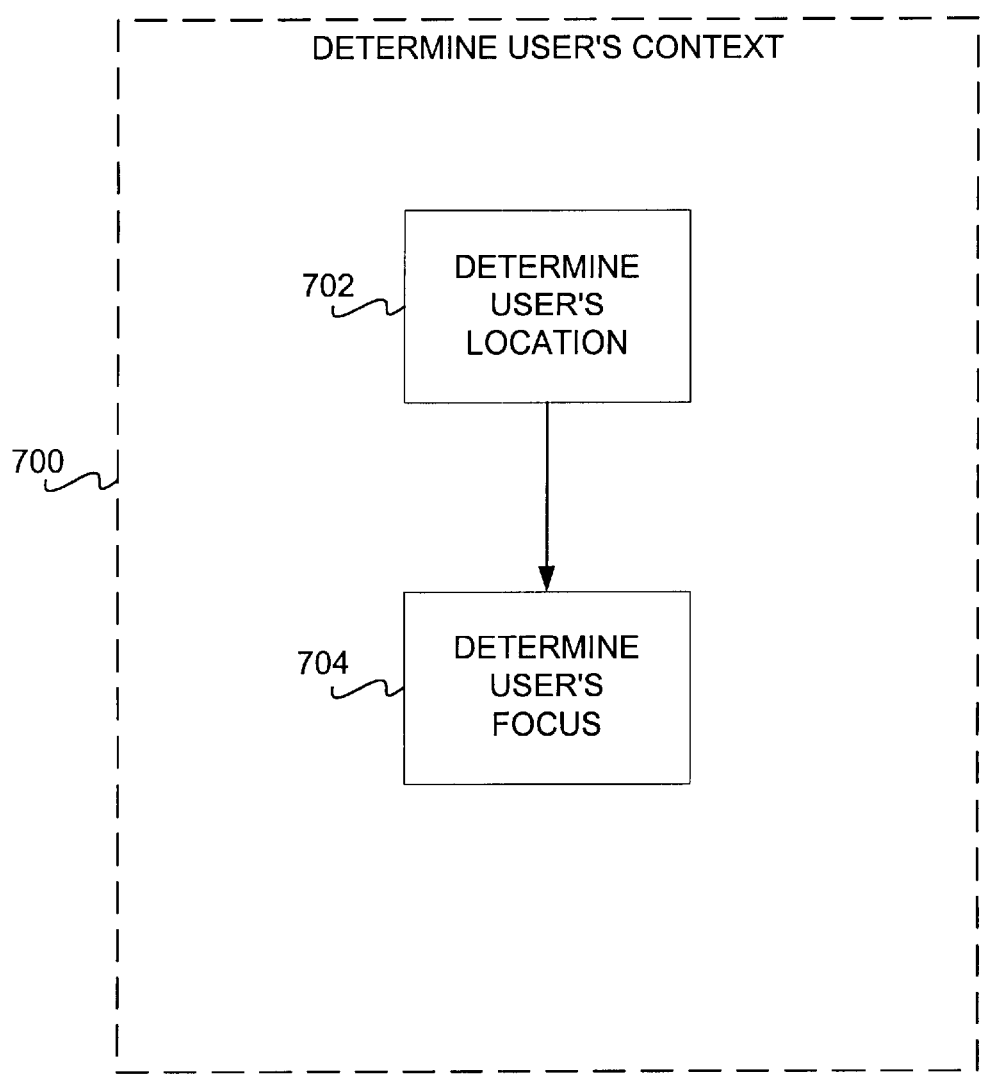

Referring to FIG. 7, a flowchart of a method 700 for determining a user's context is shown. The method includes determination of the user's location in 702, and the user's focus in 704. Each of these can be accomplished by one or more of the approaches described previously in the application. For example, a profile can be used; a user can directly specify his or her context; direct measurement of context can be accomplished; a set of rules can be followed; an inferential analysis, such as via a Bayesian or a statistical model, can be performed; etc.

Extensions to the embodiments of the invention that have been described are also possible, and are within the scope of the invention, as can be appreciated by those of ordinary skill within the art. For example, there can be an integrated video camera source that notes if someone is front of the computer and whether or not he or she is looking at the computer. It is noted, however, that the system can work with or without a camera. For all of the sources, the system can work with anything that is available, not requiring any particular source to perform its inferencing about context. Furthermore, in other embodiments, there can be integrated accelerometers, microphones, and proximity detectors on small PDA's that give a sense of a user's location and attention.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, while several manners by which user context can be determined have been described separately, they can be used in any combination with one another, or other context determination manners, too. Therefore, it is manifestly intended that this invention be limited only by the claims and equivalents thereof.

We claim:

1. A computer-implemented method for utilizing in conjunction with a platform for conveying notifications from one or more notification sources to one or more notification sinks for a user, comprising at least one of:

inferring a current attentional focus of the user; and, inferring a current location of the user.

2. The method of claim 1, further comprising outputting a current context of the user including the current attentional focus of the user and the current location of the user.

3. The method of claim 1, further comprising determining the current attentional focus of the user by measuring the focus via one or more sensors.

4. The method of claim 1, further comprising determining the current location of the user by measuring the location via one or more sensors.

5. The method of claim 4, wherein the one or more sensors comprises a GPS device.

6. The method of claim 1, further comprising determining the current attentional focus of the user by receiving specification of the focus by the user.

7. The method of claim 1, further comprising determining the current location of the user by receiving specification of the location by the user.

8. The method of claim 1, wherein inferring the current attentional focus of the user comprises utilizing at least one of a user profile and rules specifying the focus.

9. The method of claim 8, wherein the user profile comprises a default profile modifiable by the user.

10. The method of claim 1, wherein inferring the current location of the user comprises utilizing at least one of a user profile and rules specifying the focus.

11. The method of claim 10, wherein the user profile comprises a default profile modifiable by the user.

12. The method of claim 1, wherein inferring the focus comprises utilizing at least one of a Bayesian model and a statistical model.

13. The method of claim 1, wherein inferring the location comprises utilizing at least one of a Bayesian model and a statistical model.

14. A machine-readable medium having instructions stored thereon for execution by a processor to perform a method comprising:
    determining a current context of a user, the context of the user comprising an attentional focus of the user and a location of the user, determining the current context of the user comprising:
        determining the current attentional focus of the user, via at least one of:
            directly measuring the focus via one or more sensors;
            receiving direct specification of the focus by the user;
            utilizing at least one of a first user profile and first rules specifying the focus;
            inferring the focus;
        determining the current location of the user, via at least one of:
            directly measuring the location via the one or more sensors;
            receiving direct specification of the location by the user;
            utilizing at least one of a second user profile and second rules specifying the location; and,
            inferring the location.

15. The medium of claim 14, wherein the one or more sensors comprises a GPS device.

16. The medium of claim 14, wherein at least one of the first user profile and the second user profile comprises a default profile modifiable by the user.

17. The medium of claim 14, wherein inferring the focus comprising utilizing at least one of a Bayesian model and a statistical model.

18. The medium of claim 14, wherein inferring the location comprises utilizing at least one of Bayesian model and a statistical model.

19. A machine-readable medium having instructions stored thereon for execution by a processor to performed a method comprising:
    determining a current context of a user in connection with conveying a notification, via at least one of:
        directly measuring the context via one or more sensors;
        receiving direct specification of the context by the user;
        utilizing at least one of a user profile and rules specifying the context; and,
        inferring the context.

20. The medium of claim 19, wherein the context comprises an attentional focus of the user.

21. The medium of claim 19, wherein the context comprises a location of the user.

22. The medium of claim 19, wherein the method further comprises outputting the current context.

23. The medium of claim 19, wherein the one or more sensors comprises a GPS device.

24. The medium of claim 19, wherein the user profile comprises a default profile modifiable by the user.

25. The medium of claim 19, wherein inferring the context comprises utilizing at least one of a Bayesian model and a statistical model.

26. A method that facilitates conveying notifications, comprising:
    inferring a current attentional focus of a user;
    inferring a location of a user; and
    making a notification decision regarding the user based at least in part upon the inferred current attentional focus of the user and the inferred location of the user.

27. The method of claim 26, further comprising selecting at least one of a plurality of notifications to convey to the user, the selecting being based at least in part upon the inferred current attentional focus of the user and the inferred location of the user.

28. The method of claim 27, further comprising performing a decision-theoretic analysis relating to the inferred location of the user.

29. A notification system, comprising:
    a plurality of notification sources;
    a plurality of notification sinks;
    a user mechanism that stores information regarding variables and parameters of a user that influence notification decision-making, the stored information comprising an inferred attentional focus of a user and an inferred location of a user; and
    a notification manager that conveys notifications from a subset of the sources to a subset of the sinks based at least in part upon the information stored in the user mechanism.

30. The system of claim 29, the notification manager performing a decision-theoretic analysis relating to inferring the location of the user.

31. The system of claim 29, the notification manager determining how a notification should be conveyed.

32. The system of claim 31, the notification being conveyed in a summarized form.

* * * * *